(12) United States Patent
Yoon

(10) Patent No.: US 11,287,991 B2
(45) Date of Patent: Mar. 29, 2022

(54) MEMORY SYSTEM FOR ASSURING RELIABILITY

(71) Applicant: SK hynix Inc., Gyeonggi-do (KR)

(72) Inventor: Jeong Hyun Yoon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/951,366

(22) Filed: Nov. 18, 2020

(65) Prior Publication Data
US 2022/0011956 A1    Jan. 13, 2022

(30) Foreign Application Priority Data

Jul. 13, 2020    (KR) .......................... 10-2020-0085978

(51) Int. Cl.
*G06F 3/06*    (2006.01)
*G06F 11/07*    (2006.01)

(52) U.S. Cl.
CPC ............ *G06F 3/0634* (2013.01); *G06F 3/065* (2013.01); *G06F 3/0619* (2013.01); *G06F 3/0625* (2013.01); *G06F 3/0656* (2013.01); *G06F 3/0659* (2013.01); *G06F 3/0673* (2013.01); *G06F 11/0727* (2013.01); *G06F 11/0793* (2013.01)

(58) Field of Classification Search
CPC .... G06F 3/0634; G06F 3/0619; G06F 3/0625; G06F 3/065; G06F 3/0656; G06F 3/0659; G06F 3/0673; G06F 11/0727; G06F 11/0793

See application file for complete search history.

(56) References Cited

U.S. PATENT DOCUMENTS

| | | | |
|---|---|---|---|
| 8,321,380 B1 * | 11/2012 | Leverett ................ | G06F 16/184 707/660 |
| 10,133,637 B2 | 11/2018 | Lambert et al. | |
| 2007/0094446 A1 * | 4/2007 | Sone ....................... | G06F 1/263 711/113 |

(Continued)

FOREIGN PATENT DOCUMENTS

| | | |
|---|---|---|
| CN | 111752470 | 10/2020 |
| KR | 10-1451745 | 10/2014 |

(Continued)

*Primary Examiner* — Hiep T Nguyen
(74) *Attorney, Agent, or Firm* — IP & T Group LLP

(57) ABSTRACT

A memory system includes a memory device and a controller. The controller includes: a first internal storage, a second internal storage configured to store a recovery code, a level detector configured to detect whether a change in levels of power supply voltages exceeds respectively reference level ranges, a protection operation component configured to determine entry into and exit from a protection mode in response to a result of the level detector, to perform a first protection operation of generating event information and a snapshot information and storing the event and snapshot information in the first internal storage, and a recovery operation component configured to receive the recovery code from the second internal storage in response to exiting from the protection mode, to enter the recovery mode, to receive the event information and the snapshot information from the first internal storage, and to perform a recovery operation on the memory device.

19 Claims, 5 Drawing Sheets

(56) References Cited

U.S. PATENT DOCUMENTS

| | | | | |
|---|---|---|---|---|
| 2012/0054520 | A1* | 3/2012 | Ben-Tsion | G06F 1/30 |
| | | | | 713/322 |
| 2016/0378621 | A1* | 12/2016 | Amidi | G06F 11/1441 |
| | | | | 714/6.2 |
| 2017/0323027 | A1* | 11/2017 | Nguyen | H04L 29/06612 |
| 2018/0095871 | A1* | 4/2018 | Dreier | G06F 3/061 |
| 2020/0310664 | A1 | 10/2020 | Yoon et al. | |
| 2021/0133011 | A1* | 5/2021 | Vankamamidi | G06F 11/1469 |

FOREIGN PATENT DOCUMENTS

| | | |
|---|---|---|
| KR | 10-1869866 | 6/2018 |
| KR | 10-2020-0114017 | 10/2020 |

* cited by examiner

MEMORY SYSTEM FOR ASSURING RELIABILITY

CROSS-REFERENCE TO RELATED APPLICATION

This application claims priority under 35 U.S.C. § 119 to Korean Patent Application No. 10-2020-0085978, filed on Jul. 13, 2020, which is incorporated herein by reference in its entirety.

BACKGROUND

1. Field

Embodiments relate to a memory system, and particularly, to a memory system for assuring reliability.

2. Discussion of the Related Art

Recently, a computer environment paradigm has shifted to ubiquitous computing, which enables a computer system to be accessed virtually anytime and everywhere. As a result, the use of portable electronic devices, such as mobile phones, digital cameras, notebook computers and the like, has grown. Such portable electronic devices typically use or include a memory system that includes or embeds at least one memory device, e.g., a data storage device. The data storage device can be used as a main storage device or an auxiliary storage device of a portable electronic device.

A computing device benefits from implementing data storage in the form of a nonvolatile semiconductor memory device because the device has excellent stability and durability due to the lack of a mechanical driving part (e.g., a mechanical arm in a hard disk) and can exhibit high data access speeds and low power consumption. Examples of semiconductor data storage devices include a universal serial bus (USB) memory device, a memory card having various interfaces, and/or a solid state drive (SSD).

SUMMARY

Various embodiments are directed to a memory system capable of effectively assuring reliability even when the level of a power supply voltage supplied from an exterior is changed.

In an embodiment, a memory system may include: a memory device; and a controller operably coupled to the memory device through a plurality of interfaces. The controller may include: a first internal storage having volatile characteristics; a second internal storage having nonvolatile characteristics and configured to store a recovery code; a level detector configured to detect whether a change in levels of power supply voltages exceeds respectively reference level ranges, and to generate detection signals corresponding to a result of the detection; a protection operation component configured to determine entry into and exit from a protection mode in response to the detection signals, and to perform a first protection operation of generating event information on a state of the memory system at the time of entry into the protection mode and generating a logic value of each of the plurality of interfaces as snapshot information and storing the event information and the snapshot information in the first internal storage, and the protection operation component further configured to perform a second protection operation of fixing each of the plurality of interfaces to a set logic value; and a recovery operation component configured to receive the recovery code from the second internal storage in response to the memory system exiting from the protection mode, to enter the recovery mode, to receive the event information and the snapshot information from the first internal storage, and to perform a recovery operation on the memory device.

The protection operation component may generate operation information, which is related to an operation of entering the protection mode, and performance information, which indicates whether the second protection operation has been completed, at the time of entry into the protection mode in response to the detection signals, and may store the operation information and the performance information in the first internal storage as the event information.

The controller may further include: a buffer configured to buffer a signal to be transmitted to the memory device through the plurality of interfaces. The protection operation component may generate a logic value of the signal buffered by the buffer at the time of entry into the protection mode as the snapshot information, and stores the snapshot information in the first internal storage.

The recovery operation component may identify data having a higher probability of occurrence of an error than a reference probability among data stored in the memory device in response to the event information and the snapshot information in the recovery mode, and may perform an error correction operation on the identified data.

The power supply voltages may include: a first power supply voltage targeting a first reference level and being used as an operating voltage of the controller and the memory device; and a second power supply voltage targeting a second reference level greater than the first reference level and being used as an operating voltage of the plurality of interfaces.

The reference level ranges may include a first reference level range in which the first reference level is an intermediate level and a second reference level range in which the second reference level is an intermediate level. The level detector may activate a first detection signal of the detection signals when the second power supply voltage exceeds a maximum level of the second reference level range or falls below a minimum level thereof, and may activate a second detection signal of the detection signals when the first power supply voltage exceeds a maximum level of the first reference level range or falls below a minimum level thereof.

The protection operation component may enter the protection mode in response to activation of at least one of the first and second detection signals and exits from the protection mode in response to inactivation of both the first and second detection signals.

The protection operation component may generate the operation information indicating whether the first detection has been activated and whether the second detection signal has been activated.

The memory system may further include: a voltage generator configured to receive the first power supply voltage and generate a third power supply voltage targeting a third reference level and being used as the operating voltage of the controller, to receive the first power supply voltage and generate a fourth power supply voltage targeting a fourth reference level and being used as the operating voltage of the memory device, to receive the second power supply voltage and generate a fifth power supply voltage targeting a fifth reference level greater than the third reference level and being used as an operating voltage of a circuit of the controller for driving the plurality of interfaces, and to receive the second power supply voltage and generate a sixth power supply voltage targeting a sixth reference level greater than the fourth reference level and being used as an operating voltage of a circuit of the memory device for driving the plurality of interfaces.

The reference level ranges may include a third reference level range in which the third reference level is an intermediate level, a fourth reference level range in which the fourth reference level is an intermediate level, a fifth reference level range in which the fifth reference level is an intermediate level, and a sixth reference level range in which the sixth reference level is an intermediate level. The level detector may activate a third detection signal of the detection signals when the third power supply voltage exceeds a maximum level of the third reference level range or falls below a minimum level thereof, may activate a fourth detection signal of the detection signals when the fourth power supply voltage exceeds a maximum level of the fourth reference level range or falls below a minimum level thereof, may activate a fifth detection signal of the detection signals when the fifth power supply voltage exceeds a maximum level of the fifth reference level range or falls below a minimum level thereof, and may activate a sixth detection signal of the detection signals when the sixth power supply voltage exceeds a maximum level of the sixth reference level range or falls below a minimum level thereof.

The protection operation component may enter the protection mode in response to activation of any one of the third to sixth detection signals and may exit from the protection mode in response to inactivation of all the third to sixth detection signals.

The protection operation component may generate the operation information indicating whether the third detection has been activated, whether the fourth detection signal has been activated, whether the fifth detection has been activated, and whether the sixth detection signal has been activated.

The power supply voltages may include: a seventh power supply voltage targeting a seventh reference level and being used as an operating voltage of the controller; an eighth power supply voltage targeting an eighth reference level and being used as an operating voltage of the memory device; a ninth power supply voltage targeting a ninth reference level greater than the seventh reference level and being used as an operating voltage of a circuit of the controller for driving the plurality of interfaces; and a tenth power supply voltage targeting a tenth reference level greater than the eighth reference level and being used as an operating voltage of a circuit of the memory device for driving the plurality of interfaces.

The reference level ranges may include a seventh reference level range in which the seventh reference level is an intermediate level, an eighth reference level range in which the eighth reference level is an intermediate level, a ninth reference level range in which the ninth reference level is an intermediate level, and a tenth reference level range in which the tenth reference level is an intermediate level. The level detection component may activate a seventh detection signal of the detection signals when the seventh power supply voltage exceeds a maximum level of the seventh reference level range or falls below a minimum level thereof, may activate an eighth detection signal of the detection signals when the eighth power supply voltage exceeds a maximum level of the eighth reference level range or falls below a minimum level thereof, may activate a ninth detection signal of the detection signals when the ninth power supply voltage exceeds a maximum level of the ninth reference level range or falls below a minimum level thereof, and may activate a tenth detection signal of the detection signals when the tenth power supply voltage exceeds a maximum level of the tenth reference level range or falls below a minimum level thereof.

The protection operation component may enter the protection mode in response to activation of any one of the seventh to tenth detection signals and may exit from the protection mode in response to inactivation of all the seventh to tenth detection signals.

The protection operation component may generate the operation information indicating whether the seventh detection has been activated, whether the eighth detection signal has been activated, whether the ninth detection has been activated, and whether the tenth detection signal has been activated.

The plurality of interfaces may include a command interface, an address interface, and a data interface, and the protection operation component may perform, at the time of entry into the protection mode, the second protection operation of fixing a logic value of the command interface to a first logic value for inactivating operation of the memory device, fixing a logic value of the data interface to a second logic value, and fixing a logic value of the address interface to a third logic value which prevents the memory device from being accessed.

The protection operation component may start the first protection operation and the second protection operation simultaneously at the time of entry into the protection mode.

In an embodiment, a memory system may include: a memory device; a controller including a volatile storage and a nonvolatile storage configured to store a recovery code; and a plurality of interfaces between the controller and the memory device. The controller may be configured to: detect whether first and second voltages exceed respective reference level ranges, the first voltage for operating the controller and the memory device and the second voltage for operating the plurality of interfaces; enter a protection mode, when it is detected that one of the first and second voltages exceeds the corresponding reference level range, to store event information and snapshot information in the volatile storage, the event information being associated with the protection mode and the snapshot information being associated with the plurality of interfaces; and enter a recovery mode in response to the memory system exiting the protection mode, receive the recovery code from the nonvolatile storage and the event information and the snapshot information from the volatile storage, select at least one data item among data items stored in the memory device using the recovery code, the event information and the snapshot information, and perform an error correction operation on the selected at least one data item.

According to the present technology, when the level of a power supply voltage supplied to a memory system is changed beyond a reference level range, a protection operation for assuring the reliability of a memory device may be performed in terms of hardware, and then a recovery operation for assuring the reliability of the memory device may be performed in terms of software when a change in the level of the power supply voltage supplied from an exterior is stabilized.

Consequently, even when the level of the power supply voltage supplied to the memory system is changed beyond the reference level range, there is an effect that it is possible to assure the operational stability of the memory system.

DETAILED DESCRIPTION

Figure 1:
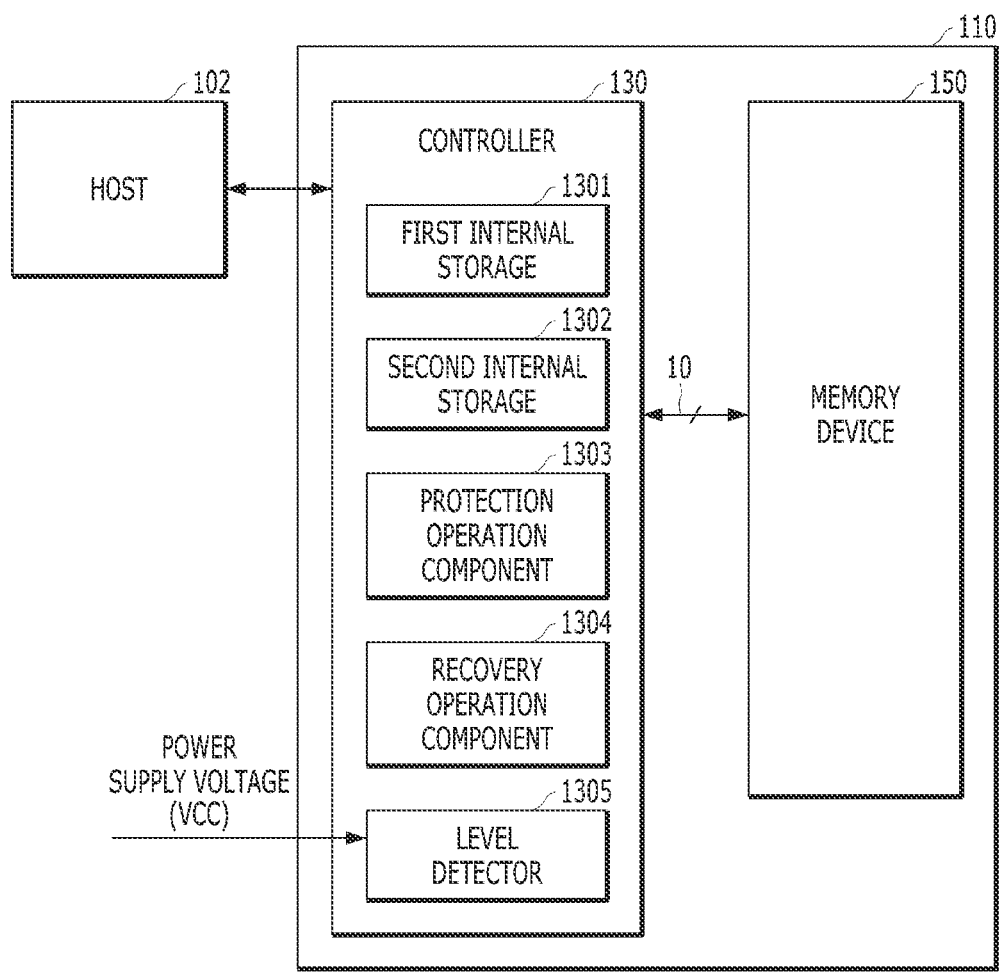
FIG. 1 is a diagram illustrating a configuration of a memory system in accordance with an embodiment.

Various examples of the disclosure are described below in more detail with reference to the accompanying drawings. Aspects and features of the present invention, however, may be embodied in different ways to form other embodiments, including variations of any of the disclosed embodiments. Thus, the invention is not limited to the embodiments set forth herein. Rather, the described embodiments are provided so that this disclosure is thorough and complete, and fully conveys the disclosure to those skilled in the art to which the invention pertains. Throughout the disclosure, like reference numerals refer to like parts throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without indicating any change in the element itself.

The drawings are not necessarily to scale and, in some instances, proportions may be exaggerated in order to clearly illustrate features of the embodiments. When an element is referred to as being connected or coupled to another element, it should be understood that the former can be directly connected or coupled to the latter, or electrically connected or coupled to the latter via one or more intervening elements therebetween. In addition, it will also be understood that when an element is referred to as being "between" two elements, it may be the only element between the two elements, or one or more intervening elements may also be present.

The terminology used herein is for the purpose of describing particular embodiments only and is not intended to limit the invention. As used herein, singular forms are intended to include the plural forms and vice versa, unless the context clearly indicates otherwise. Similarly, the indefinite articles "a" and "an" mean one or more, unless it is clear from the language or context that only one is intended.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the invention pertains in view of the disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure are described in detail below with reference to the accompanying drawings, wherein like numbers reference like elements.

FIG. 1 is a diagram for explaining a configuration of a memory system 110 in accordance with an embodiment.

Referring to FIG. 1, the memory system 110 may include a controller 130 and a memory device 150.

The memory system 110 may operate in response to a request of a host 102 and particularly, may store data that is accessed by the host 102. In other words, the memory system 100 may be used as a primary storage device or a secondary storage device of the host 102. The memory system 100 may be fabricated as any of various types of storage devices according to a host interface protocol connected to the host 102. For example, the memory system 100 may be implemented as any of various types of storage devices such as a multimedia card (MMC) in the form of a solid state drive (SSD), an MMC of an embedded MMC (eMMC), a reduced size MMC (RS-MMC), or a micro-MMC, a secure digital (SD) card in the form of an SD, a mini-SD, or a micro-SD, a universal serial bus (USB) storage device, a universal flash storage (UFS) device, a compact flash (CF) card, a smart media card, and/or a memory stick.

The memory system 100 may be implemented as a volatile memory device in the form of a dynamic random access memory (DRAM) and/or a static RAM (SRAM). In another embodiment, the memory system 100 may be implemented as a nonvolatile memory device in the form of a read only memory (ROM), a mask ROM (MROM), a programmable ROM (PROM), an erasable programmable ROM (EPROM), an electrically erasable and programmable ROM (EEPROM), a ferroelectric RAM (FRAM), a phase-change RAM (PRAM), a magnetic RAM (MRAM), a resistive RAM (RRAM), and/or a flash memory.

The memory system 110 may be fabricated as any of various types of packages, such as a package on package (POP), a system in package (SIP), a system on chip (SOC), a multi-chip package (MCP), a chip on board (COB), a wafer-level fabricated package (WFP), and/or a wafer-level stack package (WSP).

The host 102 may be embodied by any of various electronic devices. Examples of such devices include portable electronic devices such as cellular phones, MP3 players, and laptop computers, as well as larger electronic devices such as desktop computers, game machines, televisions, and projectors. That is, the host 102 may be implemented by any of a wide variety of wired/wireless electronic devices.

The host 102 includes at least one operating system (OS), which generally manages and controls the functions and operations of the host 102 and provides an interaction between a user using the memory system 100 and the host 102. Here, the operating system supports functions and operations corresponding to purpose(s) of use of the user. The OS may be divided into, for example, a general operating system and a mobile operating system according to the mobility of the host 102. Furthermore, the general operating system in the operating system may be divided into a personal operating system and an enterprise operating system according to the usage environment. For example, the personal operating system is a system specialized to support a service provision function for a general user and may include Windows, Chrome, and the like, and the enterprise operating system is a system specialized to assure and support high performance and may include a Windows server, Linux, Unix, and the like. In addition, the mobile operating system in the operating system is a system specialized to support a mobility service provision function and a power saving function of the system to users, and may include Android, iOS, Windows Mobile, and the like. The host 102 may include a plurality of operating systems, which are executed in order to perform operations with the memory system 110 corresponding to a user request. Furthermore, the host 102 transmits a plurality of commands corresponding to the user request to the memory system 110, and thus the memory system 110 performs operations corresponding to the commands, that is, operations corresponding to the user request.

More specifically, the memory system 110 includes the memory device 150 that stores data accessed by the host 102, and the controller 130 that controls the storage of the data to the memory device 150.

The controller 130 and the memory device 150 may be integrated into one semiconductor device. As an example, the controller 130 and the memory device 150 may be integrated into one semiconductor device to form an SSD. When the memory system 110 is used as the SSD, the operating speed of the host 102 electrically connected to the memory system 110 may be further improved. In addition, the controller 130 and the memory device 150 may also be integrated into one semiconductor device to form a memory card, such as a PC card (PCMCIA: personal computer memory card international association), a compact flash (CF) card, smart media cards (e.g., SM and SMC), a memory stick, multimedia cards (e.g., MMC, RS-MMC, and MMCmicro), secure digital (SD) cards (e.g., SD, miniSD, microSD, and SDHC), and/or a universal flash storage (UFS) device.

In another example, the memory system 110 may constitute one or more of a computer, an ultra mobile PC (UMPC), a workstation, a net-book, a personal digital assistants (PDA), a portable computer, a web tablet, a tablet computer, a wireless phone, a mobile phone, a smart phone, an e-book, a portable multimedia player (PMP), a portable game machine, a navigation device, a black box, a digital camera, a digital multimedia broadcasting (DMB) player, a three-dimensional television, a smart television, a digital audio recorder, a digital audio player, a digital picture recorder, a digital picture player, a digital video recorder, a digital video player, a storage constituting a data center, a device capable of transmitting and receiving information in a wireless environment, one of various electronic devices constituting a home network, one of various electronic devices constituting a computer network, one of various electronic devices constituting a telematics network, a radio frequency identification (RFID) device, and various components constituting a computing system.

The memory device 150 may retain data stored therein even though power is not supplied, and particularly, store data provided from the host 102 through a write operation and provide the stored data to the host 102 through a read operation. In addition, the memory device 150 may be a nonvolatile memory device, for example, a flash memory, and the flash memory may have a three-dimensional stack structure.

The controller 130 may control the memory device 150 in response to a request from the host 102. For example, the controller 130 may provide the host 102 with data read from the memory device 150 and store data provided from the host 102 in the memory device 150. To this end, the controller 130 may control operations of the memory device 150 such as read, write, program, and erase operations.

Hereinafter, the following description is given on the assumption that the memory device 150 is a flash memory having nonvolatile characteristics. However, the memory device 150 implemented as a flash memory is only an embodiment. In another embodiment, the memory device 150 may be a dynamic random access memory (DRAM) and/or a static RAM (SRAM) which have volatile characteristics, or may be a read only memory (ROM), a mask ROM (MROM), a programmable ROM (PROM), an erasable programmable ROM (EPROM), an electrically erasable and programmable ROM (EEPROM), a ferroelectric RAM (FRAM), a phase-change RAM (PRAM), a magnetic RAM (MRAM), and/or a resistive RAM (RRAM) which have nonvolatile characteristics. What type of memory is used to implement the memory device 150 may depend on the operational environment and/or expected use or design specifications of the memory system 110.

The memory system 110 may use, as an operating voltage, a power supply voltage VCC inputted from an external source or component. That is, the operating voltage of each of the controller 130 and the memory device 150 in the memory system 110 originates from the power supply voltage VCC.

The controller 130 may include a first internal storage 1301, a second internal storage 1302, a protection operation component 1303, a recovery operation component 1304, and a level detector 1305.

The first internal storage 1301 may have volatile characteristics and may store data generated within the controller 130.

The second internal storage 1302 may have nonvolatile characteristics and may store a recovery code. The recovery code may be executed by the controller 130 in order to enter a recovery mode and perform a recovery operation on error data stored in the memory device 150.

The level detector 1305 may detect whether a change in the level of the power supply voltage VCC exceeds a set reference level range, and generate a detection signal indicative of a result of the detection.

The protection operation component 1303 may determine entry into and exit from a protection mode in response to the detection signal generated by the level detector 1305. Furthermore, the protection operation component 1303 may perform a first protection operation of generating event information on a state of the memory system 110 at the time of entry into the protection mode and a current logic value of each of a plurality of interfaces 10 for connection to the memory device 150 as snapshot information, and storing the event information and the snapshot information in the first internal storage 1301. Furthermore, the protection operation component 1303 may perform a second protection operation of fixing each of the plurality of interfaces 10 for connection to the memory device 150 to a set logic value at the time of entry into the protection mode. The protection operation component 1303 may simultaneously start the first protection operation and the second protection operation at the time of entry into the protection mode.

The recovery operation component 1304 may receive the recovery code from the second internal storage 1302 in response to exit from the protection mode, enter the recovery mode, receive the event information and the snapshot information from the first internal storage 1301, and then perform the recovery operation on the memory device 150.

Figure 2:
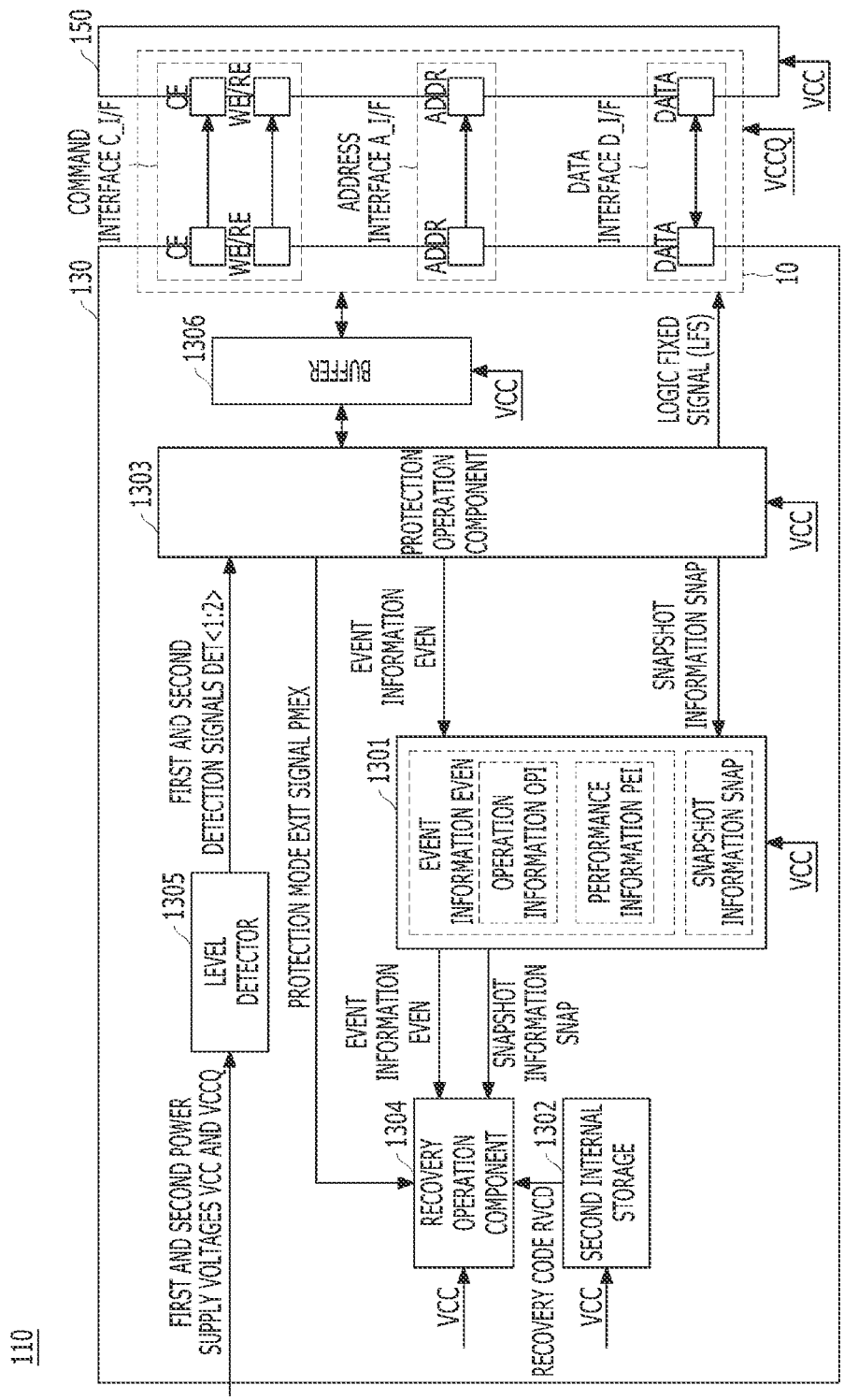
FIG. 2 is a diagram illustrating an example of a characteristic operation of a memory system in accordance with an embodiment.

FIG. 2 is a diagram illustrating an example of a characteristic operation of the memory system 110 in accordance with an embodiment.

Figure 5:
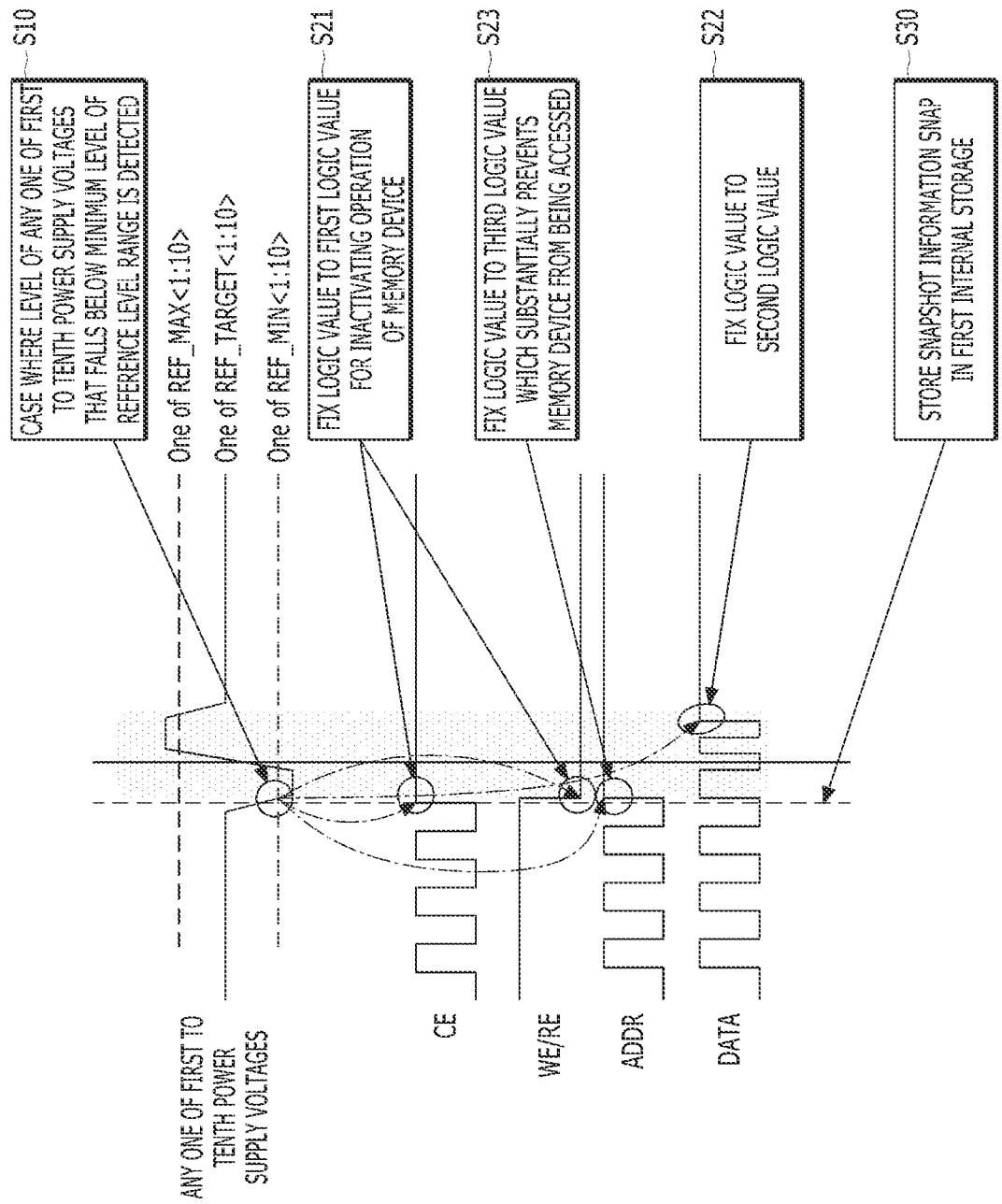
FIG. 5 a diagram illustrating the characteristic operation of a memory system in accordance with an embodiment.

FIG. 5 is a diagram illustrating the characteristic operation of the memory system 110 in accordance with an embodiment.

Referring to FIG. 2, the memory system 110 may include the controller 130 and the memory device 150, and the controller 130 and the memory device 150 may be electrically connected through the plurality of interfaces 10.

The controller 130 may include the first internal storage 1301, the second internal storage 1302, the protection operation component 1303, the recovery operation component 1304, and the level detector 1305.

The first internal storage 1301, may have volatile characteristics and may store data generated within the controller 130, for example, the event information EVEN and the snapshot information SNAP generated by the protection operation component 1303.

Furthermore, the second internal storage 1302 may have nonvolatile characteristics and may store the recovery code RVCD. The recovery code RVCD may be executed by the controller 130 in order for the recovery operation component 1304 to enter a recovery mode and perform the recovery operation on the error data stored in the memory device 150.

Specifically, the recovery code RVCD may be stored in the second internal storage 1302 during fabrication of the memory system 110. That is, the recovery code RVCD may be a program code pre-written by a designer during the manufacture of the memory system 110, which recovery code is then used for the recovery operation of the memory system 110. Accordingly, if the content of the recovery code RVCD is changed after having been written during manufacture of the memory system 110, it may not be possible to perform a normal recovery operation. That is, when the content of the recovery code RVCD 110 is changed for any reason in the process of operating the memory system 110, normal recovery of the memory system 110 is not possible even when the recovery code RVCD is executed to perform the recovery operation on the memory system 110.

Accordingly, the second internal storage 1302 storing the recovery code RVCD may be implemented as a memory device having nonvolatile characteristics, for example, a read only memory (ROM). That is, when the recovery code RVCD is stored in the second internal storage 1302 implemented as the ROM, there is no realistic possibility that the content of the recovery code RVCD will be changed due to, or during, the operation of the memory system 110. For reference, the second internal storage 1302 implemented as the ROM may store a program code, such as a booting code, the content of which may be forbidden from being changed after being written during fabrication of the memory system 110, together with the recovery code RVCD.

In some embodiments, the memory system 110 may receive two power supply voltages VCC and VCCQ from an external source and use them as operating voltages.

The first power supply voltage VCC may target a first reference level and may be used as an operating voltage of the controller 130 and the memory device 150. The second power supply voltage VCCQ may target a second reference level higher than the first reference level and may be used as an operating voltage of the plurality of interfaces 10 for transmitting signals between the memory device 150 and the controller 130. Accordingly, each of the first internal storage 1301, the second internal storage 1302, and the protection operation component 1303 may receive the first power supply voltage VCC and use the first power supply voltage VCC as an operating voltage thereof. The plurality of interfaces 10 for electrically connecting between the controller 130 and the memory device 150 may receive the second power supply voltage VCCQ and use the second power supply voltage VCCQ as an operating voltage thereof.

In some embodiments, the level detector 1305 may detect whether a change in the level of the first power supply voltage VCC exceeds a set first reference level range, and generate a first detection signal DET<1> corresponding to a result of the detection. Furthermore, the level detector 1305 may detect whether a change in the level of the second power supply voltage VCCQ exceeds a set second reference level range, and generate a second detection signal DET<2> corresponding to a result of the detection.

More specifically, referring to FIG. 2 and FIG. 5, it is preferable that the first power supply voltage VCC substantially maintain a first reference level REF_TARGET<1>, but this may not be possible due to various reasons such as noise, static electricity, and unstable power supply; thus, the voltage level of the first power supply voltage VCC may change. The first reference level range may be defined by a maximum first reference level REF_MAX<1> and a minimum first reference level REF_MIN<1>, each of which is a set level difference from the first reference level REF_TARGET<1>, which is in the middle of REF_MAX<1> and REF_MIN<1>.

Furthermore, it is preferable that the second power supply voltage VCCQ substantially maintain a second reference level REF_TARGET<2>, but this may not be possible due to various reasons such as noise, static electricity, and unstable power supply; thus, the voltage level of the second power supply voltage VCCQ may change. The second reference level range may be defined by a maximum second reference level REF_MAX<2> and a minimum second reference level REF_MIN<2>, each of which has a set level difference from the second reference level REF_TARGET<2>, which is in the middle of REF_MAX<2> and REF_MIN<2>.

By way of example, FIG. 5 illustrates that the first reference level REF_TARGET<1> and the second reference level REF_TARGET<2> are substantially the same, but the second reference level REF_TARGET<2> may be higher than the first reference level REF_TARGET<1>. Since it is assumed that the second reference level REF_TARGET<2> is higher than the first reference level REF_TARGET<1>, the minimum first reference level REF_MIN<1> may be higher than, equal to, or lower than the maximum second reference level REF_MAX<2>.

In order to assure stable operation of the memory system 110, it is important that any change in the level of the first power supply voltage VCC does not exceed the first reference level range. It is also important that any change in the level of the second power supply voltage VCCQ does not exceed the second reference level range.

That is, when the level of the first power supply voltage VCC targeting the first reference level REF_TARGET<1> changes within the maximum first reference level REF_MAX<1> and the minimum first reference level REF_MIN<1>, the controller 130 and the memory device 150 using the first power supply voltage VCC as operating power may be stably operated. However, when the level of the first power supply voltage VCC rises above the maximum first reference level REF_MAX<1> or falls below the minimum first reference level REF_MIN<1>, the controller 130 and the memory device 150 using the first power supply voltage VCC as the operating power may not be stably operated.

Similarly, when the level of the second power supply voltage VCCQ targeting the second reference level REF_TARGET<2> changes between the maximum second reference level REF_MAX<2> and the minimum second reference level REF_MIN<2>, the plurality of interfaces 10 using the second power supply voltage VCCQ as operating power may be stably operated. However, when the level of the second power supply voltage VCCQ rises above the maximum second reference level REF_MAX<2> or falls below the minimum second reference level REF_MIN<2>, the plurality of interfaces 10 using the second power supply voltage VCCQ as the operating power may not be stably operated.

When the change in the level of the first power supply voltage VCC exceeds the first reference level range, that is, the change in the level of the first power supply voltage VCC rises above the maximum first reference level REF_MAX<1> or falls below the minimum first reference level REF_MIN<1>, the level detector 1305 may activate the first detection signal DET<1>. When the change in the level of the first power supply voltage VCC stays within the first reference level range, the level detector 1305 may inactivate the first detection signal DET<1>.

When the change in the level of the second power supply voltage VCCQ exceeds the second reference level range, that is, the change in the level of the second power supply voltage VCCQ rises above the maximum second reference level REF_MAX<2> or falls below the minimum second reference level REF_MIN<2>, the level detector 1305 may activate the second detection signal DET<2>. When the change in the level of the second power supply voltage VCCQ stays within the second reference level range, the level detector 1305 may inactivate the second detection signal DET<2>.

Referring to FIG. 2, the protection operation component 1303 may determine entry into and exit from the protection mode in response to the first detection signal DET<1> and the second detection signal DET<2> generated by the level detector 1305. That is, the protection operation component 1303 may enter the protection mode in response to activation of at least one of the first detection signal DET<1> and the second detection signal DET<2> generated by the level detector 1305. Furthermore, the protection operation component 1303 may exit from the protection mode in response to inactivation of both the first detection signal DET<1> and the second detection signal DET<2> generated by the level detector 1305.

Furthermore, the protection operation component 1303 may perform the first protection operation of generating the event information EVEN on the state of the memory system 110 at the time of entry into the protection mode and the current logic value of each of a plurality of interfaces 10 as the snapshot information SNAP, and storing the event information EVEN and the snapshot information SNAP in the first internal storage 1301. Furthermore, the protection operation component 1303 may perform the second protection operation of fixing each of the plurality of interfaces 10 to a set logic value at the time of entry into the protection mode. The protection operation component 1303 may generate a logic fixed signal (LFS) at the time of entry into the protection mode for the second protection operation and transmit the logic fixed signal (LFS) to each of the plurality of interfaces 10. Each of the plurality of interfaces 10 may be fixed to the set logic value in response to the logic fixed signal (LFS). In some embodiments, the protection operation component 1303 may start the first protection operation and the second protection operation simultaneously at the time of entry into the protection mode.

The first protection operation performed by the protection operation component 1303 is described in detail as follows.

The protection operation component 1303 may generate operation information OPI, which is related to an operation of entering the protection mode, and performance information PEI, which indicates whether the second protection operation has been completed, at the time of entry into the protection mode in response to the detection signals DET<1:2> generated by the level detector 1305, that is, the first detection signal DET<1> and the second detection signal DET<2>. Further, the protection operation component 1303 may store the operation information OPI and the performance information PEI in the first internal storage 1301 as the event information EVEN.

The operation information OPI may mean all information that can be collected in relation to the operation of entering the protection mode. When the protection operation component 1303 enters the protection mode in response to inactivation of the first detection signal DET<1> and activation of the second detection signal DET<2>, the operation information OPI may include information indicating that a change in the level of the first power supply voltage VCC is normal and a change in the level of the second power supply voltage VCCQ is abnormal. When the protection operation component 1303 enters the protection mode because the first detection signal DET<1> is activated for a while and then is inactivated and the second detection signal DET<2> is activated and then continuously maintains the activated state, the operation information OPI may include information indicating that an error in which the level of the first power supply voltage VCC is instantaneously changed has occurred and a change in the level of the second power supply voltage VCCQ is abnormal. The protection operation component 1303 may generate the operation information OPT based on the first detection signal DET<1> and the second detection signal DET<2>. Accordingly, the operation information OPT may indicate whether the first detection signal DET<1> has been activated and whether the second detection signal DET<2> has been activated.

In some embodiments, the performance information PEI may be information indicating that the performance of the second protection operation of fixing each of the plurality of interfaces 10 to the set logic value at the time of entry into the protection mode has been normally performed. That is, the entry into the protection mode indicates a state in which at least one of the first power supply voltage VCC and the second power supply voltage VCCQ has experienced an abnormal level change. Thus, it is not possible to guarantee that the second protection operation of fixing each of the plurality of interfaces 10 to the set logic value in response to the logic fixed signal (LFS) transmitted from the protection operation component 1303 has been normally performed. For example, even though the protection operation component 1303 has transmitted the logic fixed signal (LFS) to each of the plurality of interfaces 10, each of the plurality of interfaces 10 may not be fixed to the set logic value due to an abnormal change in the level of the second power supply voltage VCCQ which is the operating voltage of the plurality of interfaces 10. Accordingly, the performance information PEI may indicate whether each of the plurality of interfaces 10 has been fixed to the set logic value.

In some embodiments, the controller 130 may further include a buffer 1306 for buffering a signal to be transmitted to the memory device 150 through the plurality of interfaces 10. The protection operation component 1303 may generate, as the snapshot information SNAP, a logic value of the signal buffered by the buffer 1306 at the time of entry into the protection mode and store the snapshot information SNAP in the first internal storage 1301.

For example, the time of entry into the protection mode may be when the signal buffered by the buffer 1306 is being transmitted to the memory device 150 while being carried on the plurality of interfaces 10. In such a case, the snapshot information SNAP may include a logic value of the signal carried on each of the plurality of interfaces 10. For another example, the time of entry into the protection mode may be before the signal buffered by the buffer 1306 is carried on the plurality of interfaces 10. In such a case, the snapshot information SNAP may include a logic value of a signal to be carried on each of the plurality of interfaces 10, which is different from the signal carried on each of the plurality of interfaces 10.

In some embodiments, the plurality of interfaces 10 for connection between the controller 130 and the memory device 150 may include a command interface C_I/F, an address interface A_I/F, and a data interface D_I/F.

The command interface C_I/F may be a transmission path through which the controller 130 generates a command signal for controlling the operation of the memory device 150 and transmits the command signal to the memory device 150. For example, the controller 130 may generate a write command signal, a read command signal, an erase command signal, and the like, transmit the generated command signals to the memory device 150, and use the command interface C_I/F as a path for transmitting such command signals. For reference, a 'CE' node included in the command interface CI/F may indicate a 'chip enable' node, a 'WE/RE' node included therein may indicate a 'write enable/read enable' node, and various types of command signals that are transmitted from the controller 130 to the memory device 150 may be classified through a logic combination of signals carried on each of the 'CE' node and the 'WE/RE' node. By way of example, FIG. 2 illustrates that only the 'CE' node and the 'WE/RE' node are included in the command interface C_I/F, but any other types of nodes may be included depending on the type of the memory device 150 or design specifications.

The address interface A_I/F may be a transmission path of an address signal that is transmitted from the controller 130 to the memory device 150 in order to select some of storage areas in the memory device 150 and perform a command operation. For example, the controller 130 may transmit the address signal to the memory device 150 together with the write command signal, the read command signal, the erase command signal, and the like, to specify a storage area of the memory device 150 where the command operation is performed, and use the address interface A_I/F as a path for transmitting the address signal. By way of example, FIG. 2 illustrates that only one node ADDR is included in the address interface A_I/F, but one or more nodes may be included in the address interface A_I/F. The number of nodes to be included in the address interface A_I/F may depend on the type of the memory device 150 and its design specifications.

The data interface D_I/F may be a transmission path through which data is transmitted between the controller 130 and the memory device 150. For example, the controller 130 may transmit write data to the memory device 150 together with the write command signal. Furthermore, the memory device 150 may perform a read operation in response to the read command signal received from the controller 130, and then transmit read data, which is obtained by performing the read operation, to the controller 130. The data interface D_I/F may be used as a path for transmitting the write data and the read data. By way of example, FIG. 2 illustrates that only one node DATA is included in the data interface D_I/F, but one or more nodes may be included in the data interface D_I/F. The number of nodes to be included in the data interface D_I/F may depend on the type of the memory device 150 and its design specifications.

Referring to FIG. 5, it may be assumed that a change in the level of at least one of the first power supply voltage VCC and the second power supply voltage VCCQ falls below a minimum level REF_MIN<0> or REF_MIN<1> of the corresponding reference level range (S10). As a result, the level detector 1305 may activate at least one of the first detection signal DET<1> and the second detection signal DET<2>. Accordingly, the protection operation component 1303 may enter the protection mode in response to the activated first detection signal DET<1> and/or second detection signal DET<2>. Furthermore, as described above, the protection operation component 1303 may perform the first protection operation of generating the event information EVEN and the snapshot information SNAP at the time of entry into the protection mode and storing the event information EVEN and the snapshot information SNAP in the first internal storage 1301. Furthermore, the protection operation component 1303 may perform the second protection operation of fixing each of the plurality of interfaces 10 to the set logic value at the time of entry into the protection mode. The first protection operation and the second protection operation may be simultaneously started at the time of entry into the protection mode. In the illustrated example of FIG. 5, it can be seen that an operation S30 (i.e., the first protection operation) of generating the snapshot information SNAP and storing the snapshot information SNAP in the first internal storage 1301 and steps S21 to S23 of the second protection operation are started simultaneously.

Hereinafter, the second protection operation S21 to S23 performed by the protection operation component 1303 is described in detail below with reference to FIG. 2 and FIG. 5.

As described above, the plurality of interfaces 10 may include the command interface C_I/F, the address interface A_I/F, and the data interface D_I/F. The protection operation component 1303 may perform the second protection operation of fixing the logic value of the command interface C_I/F to a first logic value for inactivating the operation of the memory device 150 at the time of entry into the protection mode (S21). That is, the command interface C_I/F may be fixed to the first logic value in response to the logic fixed signal (LFS) received from the protection operation component 1303 at the time of entry into the protection mode. The fixing of the command interface C_I/F to the first logic value may mean that a command signal for inactivating the operation of the memory device 150 is controlled to be transmitted to the memory device 150 while being carried on the command interface C_I/F. In the illustrated example of FIG. 5, an operation of fixing the 'CE' node in the command interface C_I/F, to a logic 'high' and fixing the 'WE/RE' node to a logic 'low' at the time of entry into the protection mode may be the operation of fixing the command interface C_I/F to the first logic value. In some embodiments, the inactivation of the operation of the memory device 150 may mean a state in which the memory device 150 does not perform any operation, for example, mean that, when the memory device 150 is performing a write operation, the execution of the write operation is immediately stopped.

Furthermore, the protection operation component 1303 may perform the second protection operation of fixing the logic value of the data interface D_I/F to a second logic value at the time of entry into the protection mode (S22). That is, the data interface D_I/F may be fixed to the second logic value in response to the logic fixed signal (LFS) received from the protection operation component 1303 at the time of entry into the protection mode. The fixing of the data interface D_I/F to the second logic value may mean that a logic value of a signal carried on the data interface D_I/F is fixed to a logic 'high' or a logic 'low' In the illustrated example of FIG. 5, an operation of fixing one or more 'DATA' nodes included in the data interface D_I/F to a logic 'high' at the time of entry into the protection mode may be the operation of fixing the data interface D_I/F to the second logic value.

Furthermore, the protection operation component 1303 may perform the second protection operation of fixing the logic value of the address interface A_I/F to a third logic value, which substantially prevents the memory device 150 from being accessed, at the time of entry into the protection mode (S23). That is, the address interface A_I/F may be fixed to the third logic value in response to the logic fixed signal (LFS) received from the protection operation component 1303 at the time of entry into the protection mode. The fixing of the address interface A_I/F to the third logic value may mean controlling any storage area in the memory device 150 not to be selected and to be inaccessible (out of range) through the value of an address signal carried on the address interface A_I/F. In the illustrated example of FIG. 5, it may be an operation of fixing all 'ADDR' nodes in the address interface A_I/F to a logic 'high' such that the value of the address signal transmitted to the memory device 150 through the address interface A_I/F at the time of entry into the protection mode is 'all 0xF'. In some embodiments, the controlling of any storage area in the memory device 150 not accessible (out of range), by the value of the address signal carried on the address interface A_I/F, may mean that a value of an address signal, which substantially prevents any storage area in the memory device 150 from being selected, is carried on the address interface A_I/F. For example, assuming that the memory device 150 includes a storage area of 1 gigabyte, when a value of an address signal for selecting a storage area corresponding to 2 gigabytes is carried on the address interface A_I/F, the memory device 150 is not able to select that storage area in response to the corresponding address. Thus, normal access of that storage area is not possible.

Referring back to FIG. 2, the recovery operation component 1304 may enter the recovery mode by receiving the recovery code RVCD from the second internal storage 1302 in response to an exit from the protection mode. Furthermore, in the state of entering the recovery mode, the recovery operation component 1304 may receive the event information EVEN and the snapshot information SNAP from the first internal storage 1301 and perform the recovery operation on the memory device 150.

Specifically, the protection operation component 1303 may exit from the protection mode in response to inactivation of both the first detection signal DET<1> and the second detection signal DET<2>, generate a protection mode exit signal PMEX indicating the exit from the protection mode and transmit the protection mode exit signal PMEX to the recovery operation component 1304.

Accordingly, in response to the protection mode exit signal PMEX generated by the protection operation component 1303, the recovery operation component 1304 may enter the recovery mode by receiving the recovery code RVCD from the second internal storage 1302. Subsequently, in the recovery mode, the recovery operation component 1304 may perform the recovery operation in response to the event information EVEN and the snapshot information SNAP. The recovery operation may include a classification operation and an error correction operation. The classification operation may include classifying, i.e., identifying, data having a higher probability of occurrence of an error than a set reference among data stored in the memory device 150. The error correction operation may include correcting an error occurring in the data identified through the classification operation.

The principle is as follows in which the recovery operation component 1304 may perform the classification operation through the event information EVEN and the snapshot information SNAP.

As described above, the event information EVEN may include the operation information OPI and the performance information PEI.

The operation information OPI may mean all information that can be collected in relation to the operation of entering the protection mode. Accordingly, the recovery operation component 1304 may determine the reason for entering the protection mode, through the operation information OPT. In some embodiments, by determining which voltage level of the first power supply voltage VCC and the second power supply voltage VCCQ abnormally changes to cause the entry into the protection mode, it is possible to determine whether there is a high probability of occurrence of an error within the controller 130 and the memory device 150 or whether an unintended signal is highly likely to be transmitted through the plurality of interfaces 10. When the protection mode has been entered due to the abnormal swing of the level of the first power supply voltage VCC, it may be highly probable that an error has occurred in an operation being performed within the controller 130 and the memory device 150 using the first power supply voltage VCC as the operating voltage thereof. On the other hand, when the protection mode has been entered due to abnormal change of the level of the second power supply voltage VCCQ, it may be highly probable that signals carried on the plurality of interfaces 10 using the second power supply voltage VCCQ as the operating voltage thereof may represent an unintended logic value.

In some embodiments, the performance information PEI may indicate whether the second protection operation of fixing each of the plurality of interfaces 10 to the set logic value at the time of entry into the protection mode has been normally performed. Accordingly, the recovery operation component 1304 may determine whether the second protection operation has been normally performed, through the performance information PEL. When it is determined that the second protection operation has been normally performed at the time of entry into the protection mode, the probability that signals carried on the plurality of interfaces 10 will affect the operation of the memory device 150 may greatly decrease. On the other hand, when it is determined that the second protection operation has not been normally performed at the time of entry into the protection mode, the probability that signals carried on the plurality of interfaces 10 will greatly affect the operation of the memory device 150 may increase.

In some embodiments, the snapshot information SNAP may include logic values of signals carried or signals to be carried on the plurality of interfaces 10. Accordingly, the recovery operation component 1304 may determine an operation being performed or an operation to be performed by the memory device 150, through the snapshot information SNAP. Particularly, the recovery operation component 1304 may determine a command operation being performed or to be performed by the memory device 150, through the logic value of the command signal in the snapshot information SNAP. Similarly, the recovery operation component 1304 may determine which storage area of the memory device 150 is subjected to or to be subjected to a command operation, through the logic value of the address signal in the snapshot information SNAP.

In this way, the recovery operation component 1304 may perform the classification operation of classifying the data having a higher probability of occurrence of an error than the set reference, among the data stored in the memory device 150, through the event information EVEN and the snapshot information SNAP. After the classification operation is performed, the recovery operation component 1304 may perform the error correction operation of correcting an error occurring in the data identified through the classification operation. The error correction operation may include an operation of confirming whether the error has actually occurred in the data identified through the classification operation and an operation of correcting the error when the error has occurred. The operation of correcting the error may or may not succeed. The error correction operation of the recovery operation component 1304 may be performed according to known technology, for example, error correction technology using coded modulation such as a low density parity check (LDPC) code, a Bose, Chaudhri, Hocquenghem (BCH) code, a turbo code, a Reed-Solomon code, a convolution code, a recursive systematic code (RSC), trellis-coded modulation (TCM), and block coded modulation (BCM); however, any suitable error correction technology may be used. Furthermore, the recovery operation component 1304 may include any circuits, modules, systems, or devices for performing the error correction.

Figure 3:
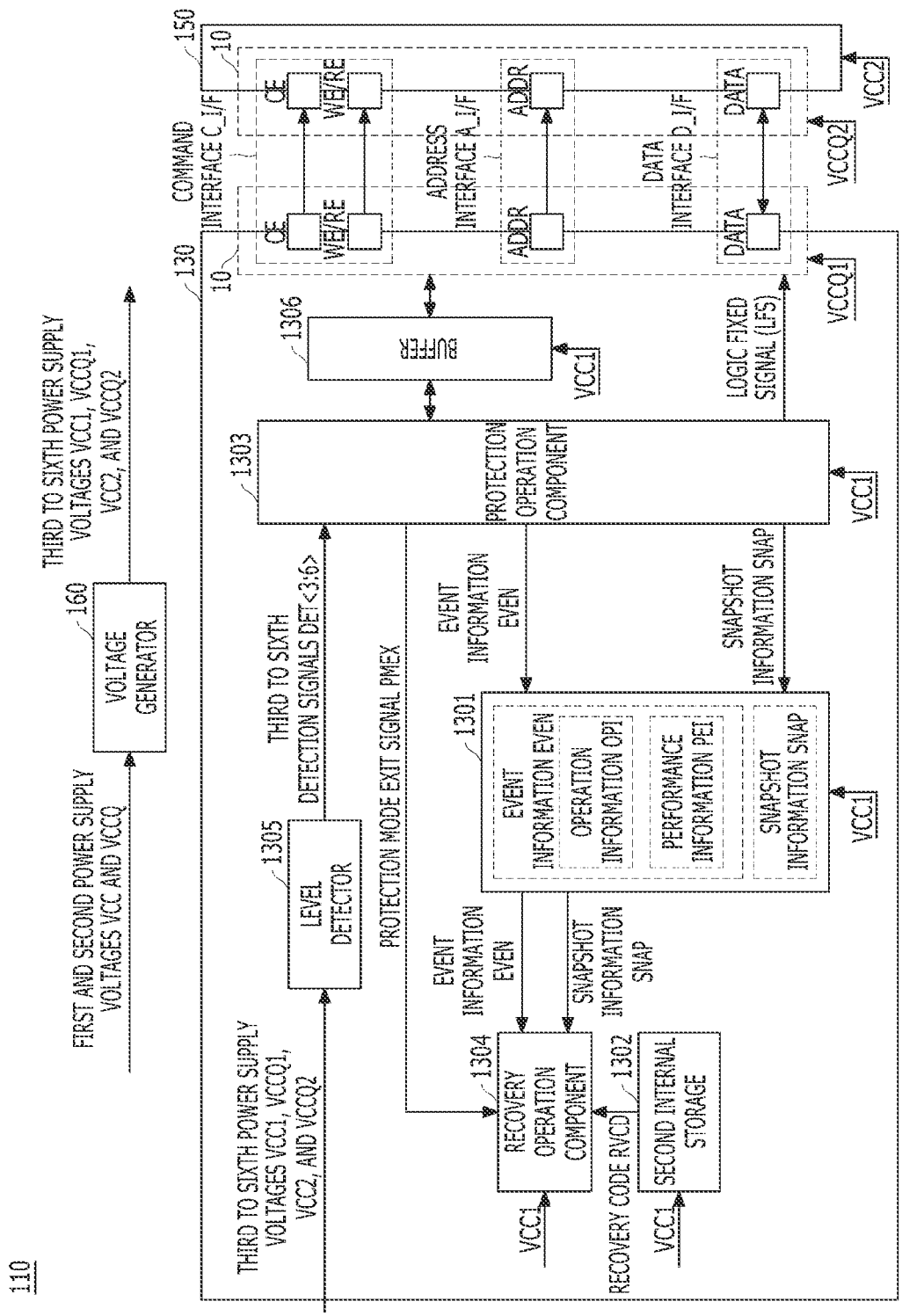
FIG. 3 is a diagram illustrating another example of the characteristic operation of a memory system in accordance with an embodiment.

FIG. 3 is a diagram illustrating another example of the characteristic operation of a memory system 110 in accordance with an embodiment.

FIG. 3 illustrates a configuration in which the memory system 110 generates four power supply voltages VCC1, VCCQ1, VCC2, and VCCQ2 in response to the two power supply voltages VCC and VCCQ inputted from an external source, and then uses the four power supply voltages VCC1, VCCQ1, VCC2, and VCCQ2 as operating voltages. That is, the main difference in configuration between the memory system 110 in FIG. 2 and the memory system 110 in FIG. 3 is the number of power supply voltages used as operating voltages. Thus, in describing the configuration and operation of the memory system 110 in FIG. 3 such description focuses on the differences relative to the memory system 110 in FIG. 2.

Referring to FIG. 3, the memory system 110 may include a voltage generator 160 that receives the first power supply voltage VCC and the second power supply voltage VCCQ from an external source, and generates the third power supply voltage VCC1, the fourth power supply voltage VCC2, the fifth power supply voltage VCCQ1, and the sixth power supply voltage VCCQ2.

Specifically, the voltage generator 160 may receive the first power supply voltage VCC and generate the third power supply voltage VCC1 that targets a third reference level and can be used as the operating voltage of the controller 130 in the memory system 110. Furthermore, the voltage generator 160 may receive the first power supply voltage VCC and generate the fourth power supply voltage VCC2 that targets a fourth reference level and can be used as the operating voltage of the memory device 150 in the memory system 110. Furthermore, the voltage generator 160 may receive the second power supply voltage VCCQ and generate the fifth power supply voltage VCCQ1 that targets a fifth reference level higher than the third reference level and can be used as the operating voltage of a circuit of the controller 130 for driving the plurality of interfaces 10 for transmitting signals between the memory device 150 and the controller 130, Furthermore, the voltage generator 160 may receive the second power supply voltage VCCQ and generate the sixth power supply voltage VCCQ2 that targets a sixth reference level higher than the fourth reference level and can be used as the operating voltage of a circuit of the memory device 150 for driving the plurality of interfaces 10 for transmitting signals between the memory device 150 and the controller 130.

Accordingly, each of the first internal storage 1301, the second internal storage 1302, and the protection operation component 1303 in the controller 130 may receive the third power supply voltage VCC1 and use the third power supply voltage VCC1 as the operating voltage thereof. Furthermore, the circuit of the memory device 150 for driving the plurality of interfaces 10 for connecting between the controller 130 and the memory device 150 may receive the fifth power supply voltage VCCQ1 and use the fifth power supply voltage VCCQ1 as the operating voltage thereof. Furthermore, the memory device 150 may receive the fourth power supply voltage VCC2 and use the fourth power supply voltage VCC2 as the operating voltage thereof. Furthermore, the circuit of the memory device 150 for driving the plurality of interfaces 10 for connecting between the memory device 150 and the controller 130 may receive the sixth power supply voltage VCCQ2 and use the sixth power supply voltage VCCQ2 as the operating voltage thereof.

The level detector 1305 in the controller 130 may detect whether a change in the level of the third power supply voltage VCC1 exceeds a set third reference level range, and generate a third detection signal DET<3> corresponding to a result of the detection. Furthermore, the level detector 1305 may detect whether a change in the level of the fourth power supply voltage VCC2 exceeds a set fourth reference level range, and generate a fourth detection signal DET<4> corresponding to a result of the detection. Furthermore, the level detector 1305 may detect whether a change in the level of the fifth power supply voltage VCCQ1 exceeds a set fifth reference level range, and generate a fifth detection signal DET<5> corresponding to a result of the detection. Furthermore, the level detector 1305 may detect whether a change in the level of the sixth power supply voltage VCCQ2 exceeds a set sixth reference level range, and generate a sixth detection signal DET<6> corresponding to a result of the detection.

More specifically, referring to FIG. 3 and FIG. 5, it is preferable that the third power supply voltage VCC1 substantially maintain a third reference level REF_TARGET<3>, but this may not be possible due to various reasons such as noise, static electricity, and unstable power supply and the voltage level of the third power supply voltage VCC1 may swing. The third reference level range may be defined by a maximum third reference level REF_MAX<3> and a minimum third reference level REF_MIN<3>, each of which is a set level difference from the third reference level REF_TARGET<3>, which is in the middle of REF_MAX<3> and REF_MIN<3>.

Furthermore, it is preferable that the fourth power supply voltage VCC2 substantially maintain a fourth reference level REF_TARGET<4>, but this may not be possible due to various reasons such as noise, static electricity, and unstable power supply and the voltage level of the fourth power supply voltage VCC2 may swing. The fourth reference level range may be defined by a maximum fourth reference level REF_MAX<4> and a minimum fourth reference level REF_MIN<4>, each of which is a set level difference from the fourth reference level REF_TARGET<4>, which is in the middle of REF_MAX<4> and REF_MIN<4>.

Furthermore, it is preferable that the fifth power supply voltage VCCQ1 substantially maintain a fifth reference level REF_TARGET<5>, but this may not be possible due to various reasons such as noise, static electricity, and unstable power supply and the voltage level of the fifth power supply voltage VCCQ1 may swing. The fifth reference level range may be defined by a maximum fifth reference level REF_MAX<5> and a minimum fifth reference level REF_MIN<5>, each of which is a set level difference from the fifth reference level REF_TARGET<5>, which is in the middle of REF_MAX<5> and REF_MIN<5>.

Furthermore, it is preferable that the sixth power supply voltage VCCQ2 substantially maintain a sixth reference level REF_TARGET<6>, but this may not be possible due to various reasons such as noise, static electricity, and unstable power supply and the voltage level of the sixth power supply voltage VCCQ2 may swing. The sixth reference level range may be defined by a maximum sixth reference level REF_MAX<6> and a minimum sixth reference level REF_MIN<6>, each of which is a set level difference from the sixth reference level REF_TARGET<6>, which is in the middle of REF_MAX<6> and REF_MIN<6>.

By way of example, FIG. 5 illustrates that the third reference level REF_TARGET<3>, the fourth reference level REF_TARGET<4>, the fifth reference level REF_TARGET<5>, and the sixth reference level REF_TARGET<6> have substantially the same level, but the fifth reference level REF_TARGET<5> may be higher than the third reference level REF_TARGET<3> and the sixth reference level REF_TARGET<6> may be higher than the fourth reference level REF_TARGET<4>. Since it is assumed that the fifth reference level REF_TARGET<5> is higher than the third reference level REF_TARGET<3>, the minimum third reference level REF_MIN<3> may be higher than, equal to, or lower than the maximum fifth reference level REF_MAX<5>. Similarly, since it is assumed that the sixth reference level REF_TARGET<6> is higher than the fourth reference level REF_TARGET<4>, the minimum fourth reference level REF_MIN<4> may be higher than, equal to, or lower than the maximum sixth reference level REF_MAX<6>. Furthermore, the third reference level REF_TARGET<3> and the fourth reference level REF_TARGET<4> may have substantially the same level or different levels. Similarly, the fifth reference level REF_TARGET<5> and the sixth reference level REF_TARGET<6> may have substantially the same level or different levels.

In order to assure a stable operation of the memory system 110, it is important that any change in the level of the third power supply voltage VCC1 does not exceed the third reference level range. It is also important that any change in the level of the fourth power supply voltage VCC2 does not exceed the fourth reference level range. It is also important that any change in the level of the fifth power supply voltage VCCQ1 does not exceed the fifth reference level range. It is also important that any change in the level of the sixth power supply voltage VCCQ2 does not exceed the sixth reference level range.

That is, when the level of the third power supply voltage VCC1 targeting the third reference level REF_TARGET<3> is changed between the maximum third reference level REF_MAX<3> and the minimum third reference level REF_MIN<3>, it can be seen that the controller 130 using the third power supply voltage VCC1 as operating power is stably operated. However, when the level of the third power supply voltage VCC1 rises above the maximum third reference level REF_MAX<3> or falls below the minimum third reference level REF_MIN<3>, the controller 130 using the third power supply voltage VCC1 as the operating power may be unstably operated.

When the level of the fourth power supply voltage VCC2 targeting the fourth reference level REF_TARGET<4> is changed between the maximum fourth reference level REF_MAX<4> and the minimum fourth reference level REF_MIN<4>, it can be seen that the memory device 150 using the fourth power supply voltage VCC2 as operating power is stably operated. However, when the level of the fourth power supply voltage VCC2 rises above the maximum fourth reference level REF_MAX<4> or falls below the minimum fourth reference level REF_MIN<4>, the memory device 150 using the fourth power supply voltage VCC2 as the operating power may be unstably operated.

Similarly, when the level of the fifth power supply voltage VCCQ1 targeting the fifth reference level REF_TARGET<5> is changed between the maximum fifth reference level REF_MAX<5> and the minimum fifth reference level REF_MIN<5>, it can be seen that a circuit for driving the plurality of interfaces 10 is stably operated in the controller 130 using the fifth power supply voltage VCCQ1 as operating power thereof. However, when the level of the fifth power supply voltage VCCQ1 rises above the maximum fifth reference level REF_MAX<5> or falls below the minimum fifth reference level REF_MIN<5>, the circuit for driving the plurality of interfaces 10 may be unstably operated in the controller 130 using the fifth power supply voltage VCCQ1 as the operating power thereof.

When the level of the sixth power supply voltage VCCQ2 targeting the sixth reference level REF_TARGET<6> is changed between the maximum sixth reference level REF_MAX<6> and the minimum sixth reference level REF_MIN<6>, it can be seen that a circuit for driving the plurality of interfaces 10 is stably operated in the memory device 150 using the sixth power supply voltage VCCQ2 as operating power thereof. However, when the level of the sixth power supply voltage VCCQ2 rises above the maximum sixth reference level REF_MAX<6> or falls below the minimum sixth reference level REF_MIN<6>, the circuit for driving the plurality of interfaces 10 may be unstably operated in the memory device 150 using the sixth power supply voltage VCCQ2 as the operating power thereof.

When the change in the level of the third power supply voltage VCC1 exceeds the third reference level range, that is, the change in the level of the third power supply voltage VCC1 rises above the maximum third reference level REF_MAX<3> or falls below the minimum third reference level REF_MIN<3>, the level detector 1305 may activate the third detection signal DET<3>. When the change in the level of the third power supply voltage VCC1 does not exceed the third reference level range, that is, the change in the level of the third power supply voltage VCC1 rises only to the maximum third reference level REF_MAX<3> or falls only to the minimum third reference level REF_MIN<3>, the level detector 1305 may inactivate the third detection signal DET<3>.

When the change in the level of the fourth power supply voltage VCC2 exceeds the fourth reference level range, that is, the change in the level of the fourth power supply voltage VCC2 rises above the maximum fourth reference level REF_MAX<4> or falls below the minimum fourth reference level REF_MIN<4>, the level detector 1305 may activate the fourth detection signal DET<4>. When the change in the level of the fourth power supply voltage VCC2 does not exceed the fourth reference level range, that is, the change in the level of the fourth power supply voltage VCC2 rises only to the maximum fourth reference level REF_MAX<4> or falls only to the minimum fourth reference level REF_MIN<4>, the level detector 1305 may inactivate the fourth detection signal DET<4>.

When the change in the level of the fifth power supply voltage VCCQ1 exceeds the fifth reference level range, that is, the change in the level of the fifth power supply voltage VCCQ1 rises above the maximum fifth reference level REF_MAX<5> or falls below the minimum fifth reference level REF_MIN<5>, the level detector 1305 may activate the fifth detection signal DET<5>. When the change in the level of the fifth power supply voltage VCCQ1 does not exceed the fifth reference level range, that is, the change in the level of the fifth power supply voltage VCCQ1 rises only to the maximum fifth reference level REF_MAX<5> or falls only to the minimum fifth reference level REF_MIN<5>, the level detector 1305 may inactivate the fifth detection signal DET<5>.

When the change in the level of the sixth power supply voltage VCCQ2 exceeds the sixth reference level range, that is, the change in the level of the sixth power supply voltage VCCQ2 rises above the maximum sixth reference level REF_MAX<6> or falls below the minimum sixth reference level REF_MIN<6>, the level detector 1305 may activate the sixth detection signal DET<6>. When the change in the level of the sixth power supply voltage VCCQ2 does not exceed the sixth reference level range, that is, the change in the level of the sixth power supply voltage VCCQ2 rises only to the maximum sixth reference level REF_MAX<6> or falls only to the minimum sixth reference level REF_MIN<6>, the level detector 1305 may inactivate the sixth detection signal DET<6>.

Referring back to FIG. 3, the protection operation component 1303 may determine entry into and exit from the protection mode in response to the third detection signal DET<3>, the fourth detection signal DET<4>, the fifth detection signal DET<5>, and the sixth detection signal DET<6>, which are generated by the level detector 1305. That is, the protection operation component 1303 may enter the protection mode in response to activation of at least one of the third detection signal DET<3>, the fourth detection signal DET<4>, the fifth detection signal DET<5>, and the sixth detection signal DET<6>. Furthermore, the protection operation component 1303 may exit from the protection mode in response to inactivation of all the third detection signal DET<3>, the fourth detection signal DET<4>, the fifth detection signal DET<5>, and the sixth detection signal DET<6>, which are generated by the level detector 1305.

Furthermore, the protection operation component 1303 may perform the first protection operation of generating the event information EVEN on the state of the memory system 110 at the time of entry into the protection mode and the current logic value of each of the plurality of interfaces 10 as the snapshot information SNAP, and storing the event information EVEN and the snapshot information SNAP in the first internal storage 1301. Furthermore, the protection operation component 1303 may perform the second protection operation of fixing each of the plurality of interfaces 10 to the set logic value at the time of entry into the protection mode.

The first protection operation and the second protection operation that may be performed by the protection operation component 1303 in FIG. 3 are substantially the same as the first protection operation and the second protection operation that may be performed by the protection operation component 1303 in FIG. 2. The difference may be that the protection operation component 1303 generates the operation information OPI in response to the third detection signal DET<3>, the fourth detection signal DET<4>, the fifth detection signal DET<5>, and the sixth detection signal DET<6>. That is, the protection operation component 1303 in FIG. 3 may generate the operation information OPI indicating whether the third detection signal DET<3> has been activated, whether the fourth detection signal DET<4> has been activated, whether the fifth detection signal DET<5> has been activated, and whether the sixth detection signal DET<6> has been activated.

As described above, the protection operation component 1303 in FIG. 3 uses the third detection signal DET<3>, the fourth detection signal DET<4>, the fifth detection signal DET<5>, and the sixth detection signal DET<6> when generating the operation information OPI. Therefore, when determining the reason for entering the protection mode through the operation information OPI, the recovery operation component 1304 in FIG. 3 may determine the reason in more detail than the recovery operation component 1304 in FIG. 2. In some embodiments, by determining which voltage level of the third power supply voltage VCC1, the fourth power supply voltage VCC2, the fifth power supply voltage VCCQ1, and the sixth power supply voltage VCCQ2 abnormally swings to cause the entry into the protection mode, it is possible to determine whether there is a high probability of occurrence of an error within the controller 130 or the memory device 150, whether an unintended signal is highly likely to be transmitted through a circuit for allowing the controller 130 to drive a signal among the plurality of interfaces 10, or whether an unintended signal is highly likely to be transmitted through a circuit for allowing the memory device 150 to drive a signal among the plurality of interfaces 10.

Figure 4:
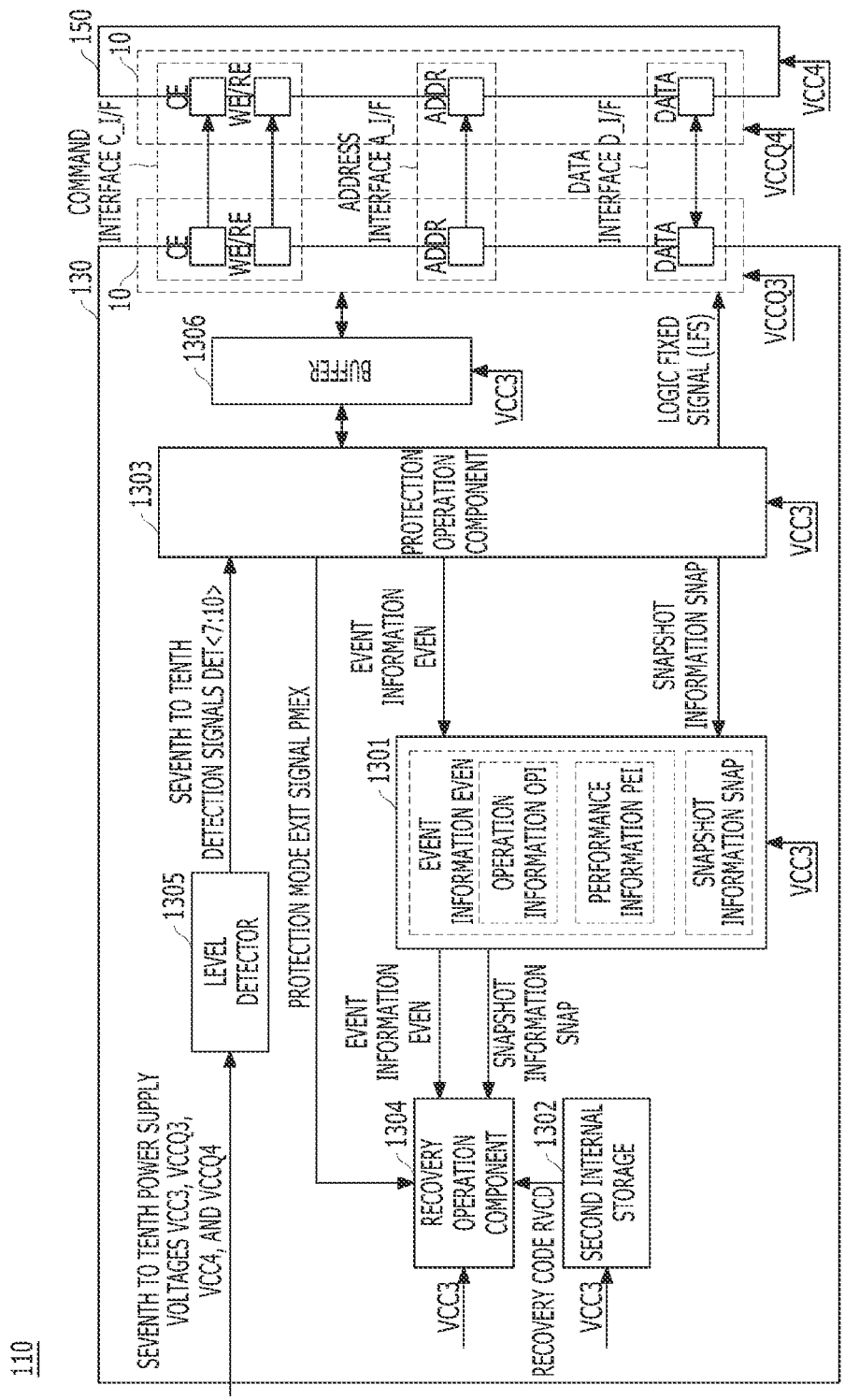
FIG. 4 is a diagram illustrating still another example of the characteristic operation of a memory system in accordance with an embodiment.

FIG. 4 is a diagram illustrating another example of the characteristic operation of a memory system 110 in accordance with an embodiment.

Referring to FIG. 4, the memory system 110 may receive four power supply voltages VCC3, VCCQ3, VCC4, and VCCQ4, that is, the seventh power supply voltage VCC3, the eighth power supply voltage VCC4, the ninth power supply voltage VCCQ3, and the tenth power supply voltage VCCQ4 from an external source, and use them as operating voltages. That is, the main difference in configuration between the memory system 110 in FIG. 3 and the memory system 110 in FIG. 4 is the number of power supply voltages inputted from an external source.

The memory system 110 in FIG. 3 includes a configuration of generating the third power supply voltage VCC1, the fourth power supply voltage VCC2, the fifth power supply voltage VCCQ1, and the sixth power supply voltage VCCQ2 in response to the first power supply voltage VCC and the second power supply voltage VCCQ, which are inputted from an external source, and using the third power supply voltage VCC1, the fourth power supply voltage VCC2, the fifth power supply voltage VCCQ1, and the sixth power supply voltage VCCQ2 as operating voltages. On the other hand, the memory system 110 in FIG. 4 includes a configuration of using the seventh power supply voltage VCC3, the eighth power supply voltage VCC4, the ninth power supply voltage VCCQ3, and the tenth power supply voltage VCCQ4, which are inputted from an external source, as operating voltages.

In summary, the memory system 110 in FIG. 3 needs to include the voltage generator 160 in the memory system 110 in order to generate the third power supply voltage VCC1, the fourth power supply voltage VCC2, the fifth power supply voltage VCCQ1, and the sixth power supply voltage VCCQ2 in response to the first power supply voltage VCC and the second power supply voltage VCCQ, which are inputted from an external source. On the other hand, since the memory system 110 in FIG. 4 directly receives the seventh power supply voltage VCC3, the eighth power supply voltage VCC4, the ninth power supply voltage VCCQ3, and the tenth power supply voltage VCCQ4, which are used as the operating voltages, from an external source, the memory system 110 does not need a component such as the voltage generator 160 in FIG. 3.

Furthermore, the memory system 110 in FIG. 3 is configured to generate the third power supply voltage VCC1 and the fourth power supply voltage VCC2 in response to the first power supply voltage VCC inputted from an external source and to generate the fifth power supply voltage VCCQ1 and the sixth power supply voltage VCCQ2 in response to the second power supply voltage VCCQ. Therefore, when the level of the first power supply voltage VCC is abnormally changed, the levels of the third power supply voltage VCC1 and the fourth power supply voltage VCC2 may also be abnormally changed. Similarly, when the level of the second power supply voltage VCCQ is abnormally changed, the levels of the fifth power supply voltage VCCQ1 and the sixth power supply voltage VCCQ2 may also be abnormally changed.

On the other hand, the memory system 110 in FIG. 4 directly receives the seventh power supply voltage VCC3, the eighth power supply voltage VCC4, the ninth power supply voltage VCCQ3, and the tenth power supply voltage VCCQ4, which are used as the operating voltages, from an external source. Therefore, the levels of the seventh power supply voltage VCC3, the eighth power supply voltage VCC4, the ninth power supply voltage VCCQ3, and the tenth power supply voltage VCCQ4 are independently changed. Therefore, in the case of the memory system 110 in FIG. 4, there is a low probability that the levels of two or more specific power supply voltages will be abnormally changed at the same time.

As described above, in accordance with embodiments of the invention, when the level of the power supply voltage VCC supplied to the memory system 110 is changed such that it is outside the reference level range, the protection operation for assuring the reliability of the memory device may be performed in connection with hardware, and then the recovery operation for assuring the reliability of the memory device may be performed in connection with software when the level of the externally-supplied power supply voltage is stabilized. Consequently, even when the level of the power supply voltage supplied to the memory system 110 deviates from the reference level range, it is possible to assure the operational stability of the memory system 110.

Although various embodiments have been illustrated and described, it will be apparent to those skilled in the art that various changes and modifications may be made without departing from the spirit and scope of the invention as defined in the following claims.

What is claimed is:

1. A memory system comprising:
   a memory device; and
   a controller operably coupled to the memory device through a plurality of interfaces,
   wherein the controller comprises:
   a first internal storage having volatile characteristics;
   a second internal storage having nonvolatile characteristics and configured to store a recovery code;
   a level detector configured to detect whether a change in levels of power supply voltages exceeds respectively reference level ranges, and to generate detection signals corresponding to a result of the detection;
   a protection operation component configured to determine entry into and exit from a protection mode in response to the detection signals, and to perform a first protection operation of generating event information on a state of the memory system at the time of entry into the protection mode and generating a logic value of each of the plurality of interfaces as snapshot information and storing the event information and the snapshot information in the first internal storage, and the protection operation component further configured to perform a second protection operation of fixing each of the plurality of interfaces to a set logic value; and
   a recovery operation component configured to receive the recovery code from the second internal storage in response to the memory system exiting from the protection mode, to enter the recovery mode, to receive the event information and the snapshot information from the first internal storage, and to perform a recovery operation on the memory device.

2. The memory system of claim 1, wherein the protection operation component generates operation information, which is related to an operation of entering the protection mode, and performance information, which indicates whether the second protection operation has been completed, at the time of entry into the protection mode in response to the detection signals, and stores the operation information and the performance information in the first internal storage as the event information.

3. The memory system of claim 2, wherein the controller further comprises:
   a buffer configured to buffer a signal to be transmitted to the memory device through the plurality of interfaces,
   wherein the protection operation component generates a logic value of the signal buffered by the buffer at the time of entry into the protection mode as the snapshot information, and stores the snapshot information in the first internal storage.

4. The memory system of claim 3, wherein the recovery operation component identifies data having a higher probability of occurrence of an error than a reference probability among data stored in the memory device in response to the event information and the snapshot information in the recovery mode, and performs an error correction operation on the identified data.

5. The memory system of claim 4, wherein the power supply voltages comprise:
 a first power supply voltage targeting a first reference level and being used as an operating voltage of the controller and the memory device; and
 a second power supply voltage targeting a second reference level greater than the first reference level and being used as an operating voltage of the plurality of interfaces.

6. The memory system of claim 5, wherein the reference level ranges include a first reference level range in which the first reference level is an intermediate level and a second reference level range in which the second reference level is an intermediate level, and
 wherein the level detector activates a first detection signal of the detection signals when the second power supply voltage exceeds a maximum level of the second reference level range or falls below a minimum level thereof, and
 activates a second detection signal of the detection signals when the first power supply voltage exceeds a maximum level of the first reference level range or falls below a minimum level thereof.

7. The memory system of claim 6, wherein the protection operation component enters the protection mode in response to activation of at least one of the first and second detection signals and exits from the protection mode in response to inactivation of both the first and second detection signals.

8. The memory system of claim 7, wherein the protection operation component generates the operation information indicating whether the first detection has been activated and whether the second detection signal has been activated.

9. The memory system of claim 5, further comprising:
 a voltage generator configured to receive the first power supply voltage and generate a third power supply voltage targeting a third reference level and being used as the operating voltage of the controller, to receive the first power supply voltage and generate a fourth power supply voltage targeting a fourth reference level and being used as the operating voltage of the memory device, to receive the second power supply voltage and generate a fifth power supply voltage targeting a fifth reference level greater than the third reference level and being used as an operating voltage of a circuit of the controller for driving the plurality of interfaces, and to receive the second power supply voltage and generate a sixth power supply voltage targeting a sixth reference level greater than the fourth reference level and being used as an operating voltage of a circuit of the memory device for driving the plurality of interfaces.

10. The memory system of claim 9, wherein the reference level ranges include a third reference level range in which the third reference level is an intermediate level, a fourth reference level range in which the fourth reference level is an intermediate level, a fifth reference level range in which the fifth reference level is an intermediate level, and a sixth reference level range in which the sixth reference level is an intermediate level, and
 wherein the level detector activates a third detection signal of the detection signals when the third power supply voltage exceeds a maximum level of the third reference level range or falls below a minimum level thereof,
 activates a fourth detection signal of the detection signals when the fourth power supply voltage exceeds a maximum level of the fourth reference level range or falls below a minimum level thereof,
 activates a fifth detection signal of the detection signals when the fifth power supply voltage exceeds a maximum level of the fifth reference level range or falls below a minimum level thereof, and
 activates a sixth detection signal of the detection signals when the sixth power supply voltage exceeds a maximum level of the sixth reference level range or falls below a minimum level thereof.

11. The memory system of claim 10, wherein the protection operation component enters the protection mode in response to activation of any one of the third to sixth detection signals and exits from the protection mode in response to inactivation of all the third to sixth detection signals.

12. The memory system of claim 11, wherein the protection operation component generates the operation information indicating whether the third detection has been activated, whether the fourth detection signal has been activated, whether the fifth detection has been activated, and whether the sixth detection signal has been activated.

13. The memory system of claim 4, wherein the power supply voltages comprise:
 a seventh power supply voltage targeting a seventh reference level and being used as an operating voltage of the controller;
 an eighth power supply voltage targeting an eighth reference level and being used as an operating voltage of the memory device;
 a ninth power supply voltage targeting a ninth reference level greater than the seventh reference level and being used as an operating voltage of a circuit of the controller for driving the plurality of interfaces; and
 a tenth power supply voltage targeting a tenth reference level greater than the eighth reference level and being used as an operating voltage of a circuit of the memory device for driving the plurality of interfaces.

14. The memory system of claim 13, wherein the reference level ranges include a seventh reference level range in which the seventh reference level is an intermediate level, an eighth reference level range in which the eighth reference level is an intermediate level, a ninth reference level range in which the ninth reference level is an intermediate level, and a tenth reference level range in which the tenth reference level is an intermediate level, and
 the level detection component activates a seventh detection signal of the detection signals when the seventh power supply voltage exceeds a maximum level of the seventh reference level range or falls below a minimum level thereof,
 activates an eighth detection signal of the detection signals when the eighth power supply voltage exceeds a maximum level of the eighth reference level range or falls below a minimum level thereof,
 activates a ninth detection signal of the detection signals when the ninth power supply voltage exceeds a maximum level of the ninth reference level range or falls below a minimum level thereof, and
 activates a tenth detection signal of the detection signals when the tenth power supply voltage exceeds a maximum level of the tenth reference level range or falls below a minimum level thereof.

15. The memory system of claim 14, wherein the protection operation component enters the protection mode in response to activation of any one of the seventh to tenth detection signals and exits from the protection mode in response to inactivation of all the seventh to tenth detection signals.

16. The memory system of claim 15, wherein the protection operation component generates the operation information indicating whether the seventh detection has been activated, whether the eighth detection signal has been activated, whether the ninth detection has been activated, and whether the tenth detection signal has been activated.

17. The memory system of claim 1, wherein the plurality of interfaces include a command interface, an address interface, and a data interface, and the protection operation component performs, at the time of entry into the protection mode, the second protection operation of fixing a logic value of the command interface to a first logic value for inactivating operation of the memory device, fixing a logic value of the data interface to a second logic value, and fixing a logic value of the address interface to a third logic value which prevents the memory device from being accessed.

18. The memory system of claim 1, wherein the protection operation component starts the first protection operation and the second protection operation simultaneously at the time of entry into the protection mode.

19. A memory system comprising:

a memory device;

a controller including a volatile storage and a nonvolatile storage configured to store a recovery code; and a plurality of interfaces between the controller and the memory device, wherein the controller is configured to:

detect whether first and second voltages exceed respective reference level ranges, the first voltage for operating the controller and the memory device and the second voltage for operating the plurality of interfaces;

enter a protection mode, when it is detected that one of the first and second voltages exceeds the corresponding reference level range, to store event information and snapshot information in the volatile storage, the event information being associated with the protection mode and the snapshot information being associated with the plurality of interfaces; and enter a recovery mode in response to the memory system exiting the protection mode, receive the recovery code from the nonvolatile storage and the event information and the snapshot information from the volatile storage, select at least one data item among data items stored in the memory device using the recovery code, the event information and the snapshot information, and perform an error correction operation on the selected at least one data item.

* * * * *